United States Patent [19]

Kimura et al.

[11] 4,283,706
[45] Aug. 11, 1981

[54] PUNCTURE DETECTING DEVICE

[75] Inventors: Shigeo Kimura, Shiki; Tadashi Kamiya, Niiza; Kiyotaka Hayashi, Asaka, all of Japan

[73] Assignee: Honda Giken Kogyo Kabushiki Kaisha, Tokyo, Japan

[21] Appl. No.: 31,433

[22] Filed: Apr. 19, 1979

[51] Int. Cl.³ .................... B60C 23/04; H01H 35/34; H01H 36/00
[52] U.S. Cl. ................................ 340/58; 200/61.25; 200/83 L; 200/83 P; 335/205
[58] Field of Search ............ 340/58; 200/61.22, 61.25, 200/82 E, 83 L, 83 P, 81.9 M, 83 A; 335/205

[56] References Cited

U.S. PATENT DOCUMENTS

| | | | |
|---|---|---|---|
| 2,704,551 | 3/1955 | Ralston | 200/83 P |
| 3,378,656 | 4/1968 | Johnson | 200/83 P |
| 3,430,196 | 2/1969 | Dalton | 200/61.25 X |
| 3,654,601 | 4/1972 | Munson et al. | 200/61.25 X |
| 3,715,719 | 2/1973 | Sugiyama | 340/58 |
| 3,760,350 | 9/1973 | Johnson | 340/58 |
| 3,873,787 | 3/1975 | Nozi | 340/58 X |
| 3,925,755 | 12/1975 | Hata | 200/61.25 X |
| 3,978,448 | 8/1976 | Vago | 340/58 |
| 4,134,102 | 1/1979 | Stewart et al. | 340/58 |
| 4,145,588 | 3/1979 | Orcutt | 200/83 P |

Primary Examiner—John W. Caldwell, Sr.
Assistant Examiner—Joseph E. Nowicki
Attorney, Agent, or Firm—Irving M. Weiner; Pamela S. Burt; John L. Shortley

[57] ABSTRACT

A tire puncture detecting device having a pressure chamber defined by a flexible diaphragm and held in communication with the interior of the tire, an atmospheric chamber communicating with the atmosphere, and a spring plate member disposed in the pressure chamber and supporting on the front face thereof a magnet and on the rear face thereof a central portion of the flexible diaphragm. The spring plate member is normally maintained in a retracted position under the air pressure in the pressure chamber against the bias of a resilient member disposed rearwardly of the spring plate member. When a reduction in the air pressure in the pressure chamber exceeds a predetermined degree, the spring plate member buckles so as to quickly project forwardly under the force of the resilient member. In this manner, the magnet supported on the spring plate member is moved closer to an alarm circuit switch located in front of the device and energizable by magnetic force, thereby actuating the switch. Puncturing of the tire is thus detected rapidly and reliably.

20 Claims, 10 Drawing Figures

PUNCTURE DETECTING DEVICE

BACKGROUND OF THE INVENTION

1. Field of the Invention

The present invention relates to a device for detecting a puncture in an automobile tire. More particularly, the invention relates to a puncture detecting device in which a spring plate member is disposed in a pressure chamber defined by a flexible diaphragm, and is held in communication with the interior of a tire. A magnet is carried on a front face of the spring plate member. The spring plate member is normally maintained in a retracted position against resiliency, by the air pressure in the pressure chamber, to thereby hold the magnet away from an alarm circuit switch adapted to be actuated by magnetic force. The spring plate member is buckled so as to rapidly project forwardly under the resiliency when the air pressure in the pressure chamber decreases below a predetermined amount due to puncturing of the tire, whereby the magnet is moved closer to the switch to energize the same.

2. Description of the Art

A variety of puncture detecting devices have been known and proposed in which a magnet is resiliently supported and normally retracted by air pressure from the interior of a pneumatic tire, the magnet being forwardly movable closer to a switch of an alarm circuit in response to a reduction in the air pressure in the tire, whereupon the alarm circuit is actuated.

Such puncture detecting devices are generally built in a rim having a relatively large width. It has been difficult to mount the devices on a relatively narrow rim. Such known puncture detecting devices are affected by speed, and thus become too sensitive due to centrifugal forces when the rim revolves at high speeds. Furthermore, because the devices are mounted in a space in the rim, they are subjected to structural limitations which have led to less reliable performance.

In addition to the above problems, the conventional puncture detecting devices have suffered from a disadvantage in that the magnet is not supported in a stable manner, and is likely to wobble due to centrifugal forces, resulting in friction with surrounding parts. The devices thus tend to malfunction when the tire air pressure is reduced, and hence have a decreased degree of responsiveness and rapid puncture detection. When the magnet is accompanied by a shunt core that serves to absorb magnetic flux, if the magnet is accidentally moved from its proper position due to centrifugal forces the magnet and the shunt core tend to detach from one another. When the magnet has become displaced, a leakage of magnetic flux occurs. Where the magnet is supported by a diaphragm and is urged by a spring acting against the tire pressure, the magnet cannot be rapidly displaced forwardly in response to a reduction in the tire pressure. Thus, a relatively long interval of time is required for movement of the magnet toward the switch, precluding quick puncture detection by the device.

The present invention has been provided to overcome the above-discussed disadvantages and shortcomings associated with known puncture detecting devices.

SUMMARY OF THE INVENTION

The invention provides a puncture detecting device including a body casing, and an alarm circuit switch disposed forwardly of the body casing, the alarm circuit switch being actuatable by magnetic force. A pressure chamber is formed in the body casing, the pressure chamber communicating with the interior of a tire. An atmospheric chamber is formed in the body casing, the atmospheric chamber communicating with the atmosphere. A flexible diaphragm sealingly separates the pressure chamber from the atmospheric chamber, and a snap-acting spring plate member is disposed in the pressure chamber, and is connected to the flexible diaphragm. A magnet is supported on the front face of the spring plate member, and resilient means are provided for resiliently urging the spring plate member from the rear side thereof. The spring plate member is normally held in a rearward direction against the resilient means by the air pressure in the pressure chamber to permit the magnet to be spaced from the switch. The spring plate member is buckled under the force from the resilient means so as to rapidly project forwardly when the air pressure in the pressure chamber decreases below a predetermined amount, whereby the magnet is moved closer to the switch to actuate the switch.

An object of the present invention is to provide a puncture detecting device wherein a magnet is supported on a diaphragm spring plate of the Belleville-spring type fixed at its periphery to a body member. The magnet is thus held reliably in position without being affected by centrifugal force, and maintains a proper position relative to a switch to enhance the reliability of the device.

Still another object of the invention is to provide a puncture detecting device which employs the buckling action of a Belleville spring type diaphragm spring, whereby the device can operate reliably beyond a critical buckling point for speedy and reliable puncture detection. When the magnet is accompanied by a shunt core with the magnet positioned transversely, because the magnet is held properly and reliably in position, the shunt core is unlikely to become detached and serves only as a magnetic-flux absorber, without any concern about surface roughness of the core. This feature of the invention also adds to reliable and proper detecting operation.

Yet another object of the invention is to provide a puncture detecting device which can be produced by adding a diaphragm spring plate, shaped like a Belleville spring, to a conventional device. The puncture detecting device is simple in structure, has a minimum number of constituent parts, can be assembled with ease, and can be manufactured inexpensively. The puncture detecting device in accordance with the invention, even if of the shunt core type, can be easily manufactured.

Other objects and details of the invention will become apparent from the following description, when read in conjunction with the accompanying drawings.

DETAILED DESCRIPTION OF PREFERRED EMBODIMENTS

Figure 1:
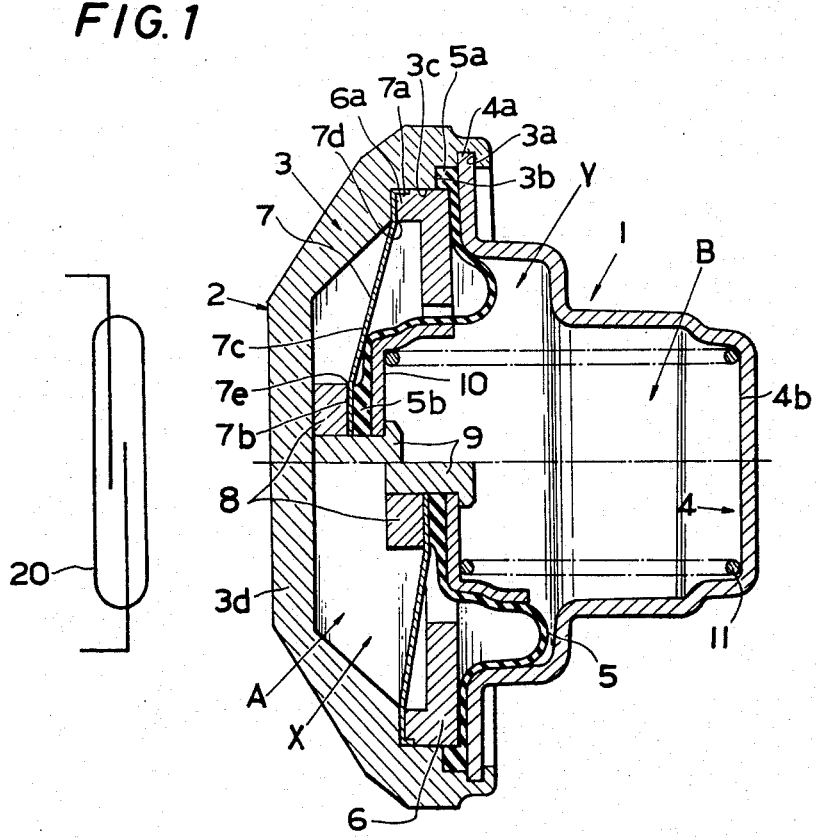
FIG. 1 is a vertical cross-sectional view of a puncture detecting device according to the invention, with one-half of the device being in a set position and the other half in an actuated position.

With reference to FIG. 1, a puncture detecting device 1 according to the present invention comprises a body 2 housing therein a magnet 8, and a reed switch 20 disposed forwardly of and spaced from body 2. The reed switch 20 is wired in circuit with an alarm circuit, such as a light or buzzer (not shown), for energizing and de-energizing the circuit.

The body 2 includes a body member 3 and a cap 4, the body member 3 being formed of a magnetically permeable material to allow the magnet-actuated reed switch 20 to become energized in response to movement of the magnet toward reed switch 20. The body member 3 is dish-shaped and has an annular groove 3a provided in the largest diameter, inner peripheral surface of body member 3. A radially outward flange 4a on cap 4 has the outer edge thereof fitted in annular groove 3a so as to connect cap 4 and body member 3 together. A pair of retainer steps 3b, 3c are disposed inwardly of groove 3a in body member 3. The outer step 3b engages a peripheral edge 5a of a diaphragm 5 acting as a sealing partition between the interiors of body member 3 and cap 4. The inner step 3c supports a peripheral edge 6a of an annular shunt core 6 having an L-shaped cross section and acting to absorb magnetic flux. The shunt core 6 and the diaphragm 5 thus fitted in the steps 3c and 3b are retained in body member 3 with the diaphragm 5 held against flange 4a of cap 4.

A diaphragm spring plate 7 in the form of a Belleville spring is located forwardly of diaphragm 5. The plate 7 is made of quenched sheet steel with a predetermined degree of resiliency. The plate 7 has a bent peripheral edge 7a fitted between an outer peripheral surface of shunt core 6 and the step 3c so as to be fixed to body member 3.

Diaphragm 5 has a central thickened portion 5b abutting against a central portion 7b of diaphragm spring plate 7. A magnet 8 is secured to central portion 7b. A rivet 9 extends through thickened portion 5b, central portion 7b, and magnet 8, to fasten them together. A cup-shaped diaphragm support 10 formed of rigid material supports thereon diaphragm 5, and is coupled by rivet 9 to magnet 8, diaphragm spring plate 7, and diaphragm 5. A coil spring 11 is disposed between support 10 and a rear bottom 4b of cap 4 for normally urging support 10, diaphragm 5, spring plate 7, and magnet 8 forwardly toward body member 3.

A chamber B defined by diaphragm 5 in cap 4 is vented to the atmosphere, and a chamber A sealingly separated from chamber B by diaphragm 5 communicates with the interior of the pneumatic tire to which the device 1 is attached. In this manner, chamber A is pressurized with the air pressure in the tire.

With the tire air pressure introduced into the chamber A, the diaphragm 5 is pressed at its front surface and is retracted rearwardly against the bias of spring 11 such that central portion 7b of spring plate 7 and magnet 8, which are connected to diaphragm 5, are also biased rearwardly. Because spring plate 7 is fixedly supported at the peripheral edge thereof on body member 3 and at the central portion thereof on diaphragm central portion 5b and magnet 8, the spring plate 7 is provided with flexible bends 7d, 7e located at the edges of an intermediate portion 7c extending between the peripheral edge and central portion of spring plate 7.

Diaphragm spring plate 7 has a tendency, upon being shaped, to become slightly concaved so as to be in its retracted position with flexible bends 7d, 7e slightly bent. In response to the introduction of air under pressure from the tire into chamber A, spring plate 7 is retracted against the force from spring 11 and becomes less concave, whereupon magnet 8 supported on central portion 7b has the front face thereof spaced from front wall 3d of body member 3. The magnet 8 is thus spaced away from reed switch 20, which is then de-energized to break the alarm circuit. The position of the parts at this time is shown by the lower half X of the device shown in FIG. 1. As long as the air pressure in the tire is normal, such relative position of the parts remains continuously the same.

When the tire is punctured, the air pressure in the tire decreases, and chamber A communicating with the interior of the tire becomes less pressurized. At this point, equilibrium between the energy stored in spring 11 and the air pressure acting on diaphragm 5 superimposed by the attractive force of magnet 8 on shunt core 6, together with the tendency of the diaphragm spring plate 7 to retain its original contour, is broken. Therefore, the central portions 5b, 7b of diaphragm 5 and spring plate 7 are advanced toward the central wall 3d of body member 3 under the force of spring 11 against the resiliency of spring plate 7, at which time the intermediate portion 7c is also moved forwardly with the bends 7d, 7e being flexed. When spring plate 7 is pushed forwardly beyond a certain critical point, spring plate 7 springs of its own accord to enable central portion 7b and intermediate portion 7c to advance rapidly until magnet 8 supported on central portion 7b abuts against front wall 3d of body member 3. At this time, magnet 8 moves closer to reed switch 20, whereupon reed switch 20 is actuated by magnetic force acting through body member 3, thereby completing the alarm circuit. The relative position of parts at such time is illustrated in the upper half Y of FIG. 1.

Figure 2:
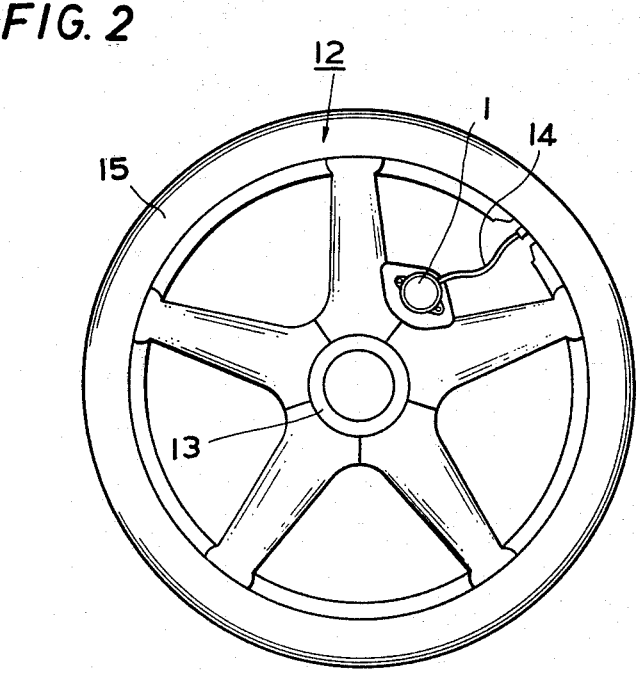
FIG. 2 is an elevational view of an application of use of the puncture detecting device.

With reference to FIG. 2, body 2 of device 1 is mounted via a bracket on a hub 13 of a wheel 12, with reed switch 20 being installed on a vehicle body. Chamber A in body member 3 of body 2 is coupled with one end of a pipe 14, the other end of which extends through a rim for communication with the interior of tire 15.

A variety of embodiments of the diaphragm spring plate 7 will be described hereinbelow with reference to FIGS. 3-5.

Figure 3:
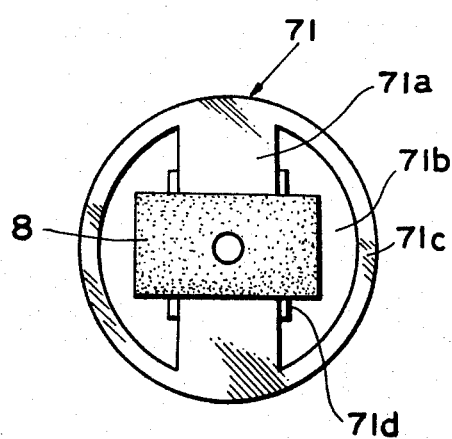
FIGS. 3 through 5 illustrate various embodiments of a diaphragm spring plate for use in the puncture detecting device of the invention.

The embodiment of the diaphragm spring plate shown in FIG. 3 comprises a circular plate 71 having a central vertical magnet holder 71a, there being a pair of semicircular cut-out recesses 71b provided to facilitate the flexing of plate 71. The recesses are surrounded by a circular fitting edge portion 71c contiguous to the outer edges of holder 71a. Magnet 8 extends transversely of, and is riveted to, the central portion of holder 71a. A plurality of supports 71d are mounted on the sides of holder 71a and hold magnet 8 therebetween at the upper and lower edges thereof.

Figure 4:
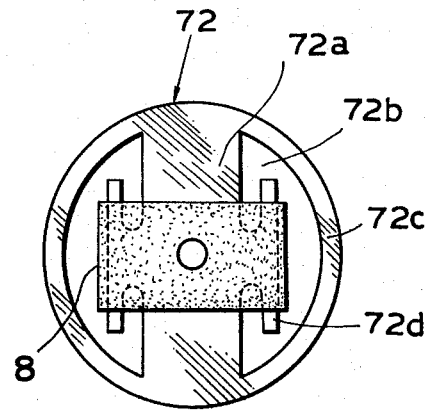

The diaphragm spring plate 72 shown in FIG. 4 includes, as in the FIG. 3 embodiment, a holder 72a, a pair of cut-out recesses 72b, and a fitting portion 72c. The holder 72a includes supports 72d located one on each side thereof and having a vertical length sufficiently larger than the width of magnet 72d.

Figure 5:
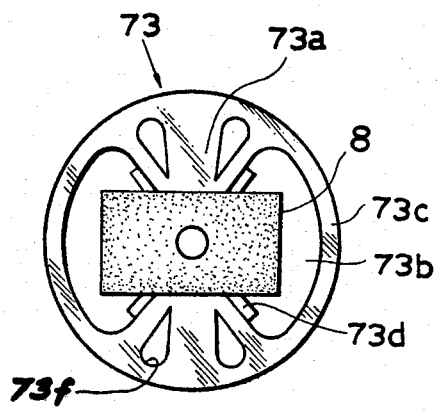

According to the embodiment shown in FIG. 5, a plate 73 has a pair of oblong recesses 73b disposed one on each side of a central holder 73a, and a plurality of holes 73f disposed in upper and lower positions. The magnet 8 is mounted on the holder 73a. A plurality of supports 73d are located adjacent to oblong recess 73b and magnet 8.

Figure 6:
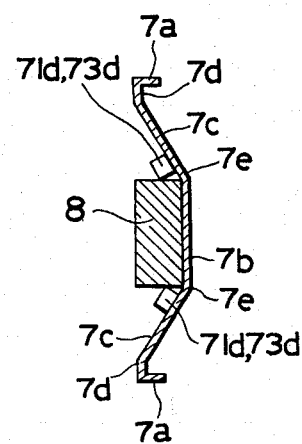
FIG. 6 is a vertical cross-sectional view of a magnet and its locking members on the diaphragm spring plate of any one of the embodiments shown in FIGS. 3 through 5, showing the normal position of the diaphragm spring plate.
Figure 7:
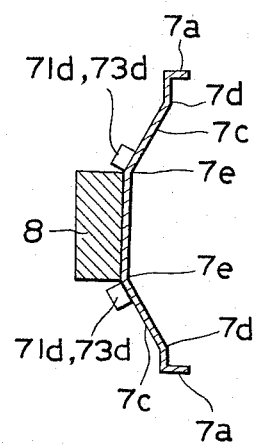
FIG. 7 is a vertical cross-sectional view showing the position in which the diaphragm spring plate of FIG. 6 is actuated.

The spring plates shown in FIGS. 3 through 5 will be commonly indicated by the numeral 7 used in FIG. 1, with reference to FIGS. 6 and 7 which show the spring plate in cross section taken along a vertical central line. The peripheral fitting edge portion 71c, 72c or 73c in FIGS. 3 through 5 is bent rearwardly into a locking edge 7a, and a central portion of holder 71a, 72a or 73a is flattened so as to serve as an attachment surface 7b. The intermediate portion 7c is so pressed as to extend rearwardly between bends 7d, 7e. The cross-sectional shape of the plate is thus prefabricated as shown in FIG. 6, with magnet 8 being held in position by supports 71d, 72d or 73d. When the plate is actuated, the central portion 7b projects forwardly with the bends acting as hinges as shown in FIG. 7, whereupon supports 71d, 72d or 73d release magnet 8.

Figure 8:
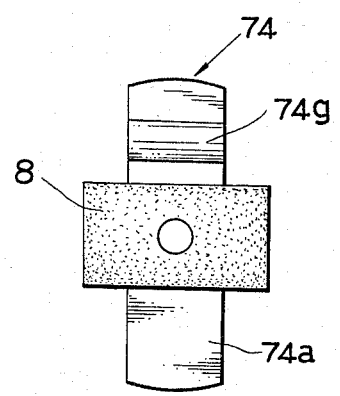
FIG. 8 is a front elevational view of a diaphragm spring plate according to another embodiment.
Figure 9:
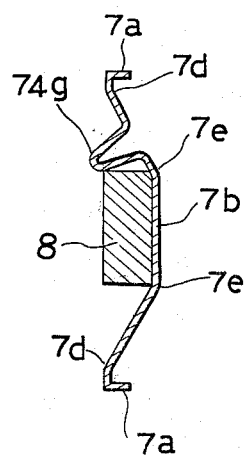
FIG. 9 is a vertical cross-sectional view of the diaphragm spring plate shown in FIG. 8, showing the diaphragm spring plate in a normal position.
Figure 10:
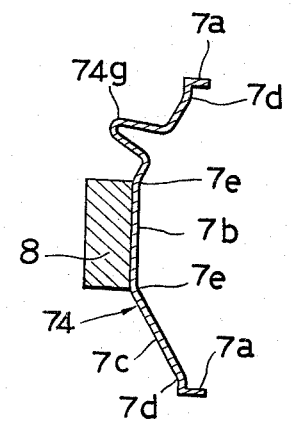
FIG. 10 is a view similar to FIG. 9, showing the diaphragm spring plate after having been actuated.

FIGS. 8 through 10 show still another embodiment in which a diaphragm spring plate 74 extends vertically. The plate 74 has disposed on its upper and lower ends a pair of locking edges 7a extending rearwardly, and includes a resilient portion 74a having a central portion 7b on which magnet 8 is mounted. The resilient portion 74a is provided with an integral presser 74g bent and projecting forwardly and located upwardly of magnet 8. The plate 74, when formed, has a tendency to be in a position as shown in FIG. 9 in which magnet 8 is pressed, whereupon presser 74g is located at a position along a direction in which centrifugal forces act. FIG. 10 shows the position of the parts upon actuation. The presser 74g acts in the same manner as supports 71d, 72d or 73d.

All of the above-described diaphragm spring plates are made of pressed steel plate, and are hardened to a predetermined degree of resiliency.

Although the magnet extends transversely in the illustrated embodiments, it may alternatively be disposed vertically.

According to the present invention, because the magnet is supported on the Belleville-spring-shaped diaphragm spring plate fixed to the body, the magnet is supported reliably against wobbling movement due to centrifugal action, and the reed switch is reliably and speedily energized upon movement of the magnet toward the reed switch, whereby tire punctures can be detected reliably.

Because the magnet is reliably held in position with precision, it does not interfere with the shunt core, which then may be finished with a roughened surface and be of a large cross section for a greater degree of magnetic flux absorption and stable performance.

Because the diaphragm spring plate is made of a pressed steel plate, it can be formed into a desired shape and have a required degree of springiness attained by quenching. The diaphragm spring plate can, in addition, be formed with ease and be attached to a conventional device to achieve the above advantages. The puncture detecting device of the invention is thus simple in structure, and can be manufactured less costly with a minimum number of parts for increased performance.

Althrough there have been described what are at present considered to be the preferred embodiments of the invention, it will be understood that various modifications may be made therein without departing from the spirit or essential characteristics thereof. The present embodiments are therefore to be considered in all respects as illustrative, and not restrictive. The scope of the invention is indicated by the appended claims rather than by the foregoing description.

We claim:

1. A puncture detecting device comprising:
   a body casing (3);
   an alarm circuit switch (20) disposed forwardly of said body casing (3), said alarm circuit switch (20) being actuable by magnetic force;
   a pressure chamber (A) formed in said body casing (3), said pressure chamber (A) communicating with the interior of a tire (15);
   an atmospheric chamber (B) formed in said body casing (3), said atmospheric chamber (B) communicating with the atmosphere;
   a flexible diaphragm (5) sealingly separating said pressure chamber (A) from said atmospheric chamber (B);
   a snap-acting spring plate member (7) disposed in said pressure chamber (A) and rigidly connected at a central portion (7b) of said snap-acting spring plate member (7) to a central portion (5b) of said flexible diaphragm (5);
   a magnet (8) supported on a front face of said snap-acting spring plate member (7);
   said magnet (8) being secured to an outer surface of said central portion (7b) of said snap-acting spring plate member (7), and being connected to said central portion (5b) of said flexible diaphragm (5) by means of said snap-acting spring plate member (7);
   resilient means (11) for resiliently urging said snap-acting spring plate member (7) from the rear side thereof;
   said snap-acting spring plate member (7) being normally held in a rearward direction against said resilient means (11) by the air pressure in said pressure chamber (A) to permit said magnet (8) to be spaced from said alarm circuit switch (20); and
   said snap-acting spring plate member (7) being buckled under the force from said resilient means (11) to rapidly project forwardly when said air pressure in said pressure chamber (A) decreases below a predetermined amount, whereby said magnet (8) is moved closer to said alarm circuit switch (20) to actuate said alarm circuit switch (20).

2. A puncture detecting device according to claim 1, wherein:
   said spring plate member comprises a diaphragm spring plate.

3. A puncture detecting device according to claim 1 or 2, wherein:

said spring plate member is forwardly movable in response to a reduction in the air pressure in said pressure chamber which exceeds a critical point of holding said plate member retracted rearwardly.

4. A puncture detecting device according to claim 1 or 2, wherein:
said body casing (3) has a front wall (3d); and
said magnet (8) is adapted to be moved into contact with a rear side of said front wall (3d) of said body casing (3) when said snap-acting spring plate member (7) projects forwardly.

5. A puncture detecting device according to claim 1 or 2, wherein:
said body casing comprises a body member adapted for communication with the interior of said tire, and a cap adapted for communication with the atmosphere.

6. A puncture detecting device according to claim 5, wherein:
said body member and said cap jointly hold said flexible diaphragm at the peripheral edge thereof, between the edges of said body member and said cap, said edges being connected together.

7. A puncture detecting device according to claim 6, wherein:
said device further includes an annular shunt core mounted in said body member and located adjacent to the peripheral edge of said flexible diaphragm.

8. A puncture detecting device according to claim 7, wherein:
said spring plate member is fixedly supported, at the peripheral edge thereof between one edge of said shunt core and a portion of said body member, within said body member.

9. A puncture detecting device according to claim 1, wherein:
said flexible diaphragm (5) is formed with a thickened central portion (5b);
said central portion (7b) of said snap-acting spring plate member (7) abuts against said thickened central portion (5b) of said flexible diaphragm (5);
said thickened central portion (5b) of said flexible diaphragm (5), said central portion (7b) of said snap-acting spring plate member (7), and said magnet (8) are connected together by a fastening member (9).

10. A puncture detecting device according to claim 1, wherein:
said body casing is mounted on a hub of a tire wheel; and
said switch is mounted on a vehicle body.

11. A puncture detecting device according to claim 1, wherein:
said snap-acting spring plate member (7) is formed of a circular plate (71) comprising a magnet holder (71a) vertically extending across the central portion thereof, a pair of cut-out recesses (71b) one on each side of said magnet holder (71a), a fitting edge portion (71c) surrounding said recesses (71b) and connected to outer edges of said magnet holder (71a), and supports (71d) on said magnet holder (71a) for supporting said magnet (8).

12. A puncture detecting device according to claim 11, wherein:
said magnet supports are adapted to grip said magnet therebetween before said spring plate member is actuated, and to release said magnet upon actuation of said spring plate member.

13. A puncture detecting device according to claim 11, wherein said magnet holder includes:
a flat central portion defining a magnet attachment surface;
outer peripheral locking edges bent rearwardly and forming part of said fitting edge portion; and
intermediate portions extending rearwardly between said magnet attachment surface and said locking edges.

14. A puncture detecting device according to claim 1, wherein said snap-acting spring plate member comprises:
a vertically elongated plate including a flat central portion defining a magnet attachment surface;
upper and lower edges bent rearwardly into locking edges;
intermediate portions extending rearwardly between said magnet attachment surface and each one of said locking edges, respectively; and
a projection formed on at least one of said intermediate portions and extending forwardly, said projection supporting and pressing said magnet before actuation of said snap-acting spring plate member.

15. A puncture detecting device according to claim 4, wherein:
said flexible diaphragm (5) is formed with a thickened central portion (5b);
said central portion (7b) of said snap-acting spring plate member (7) abuts against said thickened central portion (5b) of said flexible diaphragm (5);
said thickened central portion (5b) of said flexible diaphragm (5), said central portion (7b) of said snap-acting spring plate member (7), and said magnet (8) are connected together by a fastening member (9).

16. A puncture detecting device according to claim 8, wherein:
said flexible diaphragm (5) is formed with a thickened central portion (5b);
said central portion (7b) of said snap-acting spring plate member (7) abuts against said thickened central portion (5b) of said flexible diaphragm (5);
said thickened central portion (5b) of said flexible diaphragm (5), said central portion (7b) of said snap-acting spring plate member (7), and said magnet (8) are connected together by a fastening member (9).

17. A puncture detecting device according to claim 4, wherein:
said snap-acting spring plate member (7) is formed of a circular plate (71) comprising a magnet holder (71a) vertically extending across the central portion thereof, a pair of cut-out recesses (71b) one on each side of said magnet holder (71a), a fitting edge portion (71c) surrounding said recesses (71b) and connected to outer edges of said magnet holder (71a), and supports (71d) on said magnet holder (71a) for supporting said magnet (8).

18. A puncture detecting device according to claim 16, wherein:
said snap-acting spring plate member (7) is formed of a circular plate (71) comprising a magnet holder (71a) vertically extending across the central portion thereof, a pair of cut-out recesses (71b) one on each side of said magnet holder (71a), a fitting edge portion (71c) surrounding said recesses (71b) and connected to outer edges of said magnet holder (71a), and supports (71d) on said magnet holder (71a) for supporting said magnet (8).

19. A puncture detecting device according to claim 15, wherein said snap-acting spring plate member comprises:
a vertically elongated plate including a flat central portion defining a magnet attachment surface;
upper and lower edges bent rearwardly into locking edges;
intermediate portions extending rearwardly between said magnet attachment surface and each one of said locking edges, respectively; and
a projection formed on at least one of said intermediate portions and extending forwardly, said projection supporting and pressing said magnet before actuation of said snap-acting spring plate member.

20. A puncture detecting device according to claim 18, wherein said snap-acting spring plate member comprises:
a vertically elongated plate including a flat central portion defining a magnet attachment surface;
upper and lower edges bent rearwardly into locking edges;
intermediate portions extending rearwardly between said magnet attachment surface and each one of said locking edges, respectively; and
a projection formed on at least one of said intermediate portions and extending forwardly, said projection supporting and pressing said magnet before actuation of said snap-acting spring plate member.

* * * * *